(12) United States Patent
Kostic et al.

(10) Patent No.: US 7,957,742 B2
(45) Date of Patent: Jun. 7, 2011

(54) WLAN HAVING LOAD BALANCING BY ACCESS POINT ADMISSION/TERMINATION

(75) Inventors: Zoran Kostic, Holmdel, NJ (US); Kin K Leung, Edison, NJ (US); Hujun Yin, Whitehall, PA (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 235 days.

(21) Appl. No.: 12/214,721

(22) Filed: Jun. 20, 2008

(65) Prior Publication Data

US 2008/0259866 A1 Oct. 23, 2008

Related U.S. Application Data

(63) Continuation of application No. 10/292,863, filed on Nov. 12, 2002, now Pat. No. 7,406,319.

(60) Provisional application No. 60/332,956, filed on Nov. 19, 2001.

(51) Int. Cl.
*H04W 36/00* (2009.01)
*H04W 4/00* (2009.01)
*H04W 72/00* (2009.01)
*H04W 40/00* (2009.01)

(52) U.S. Cl. ............... 455/438; 455/453; 455/435.1; 455/432.3; 455/443; 455/448; 370/328; 370/338

(58) Field of Classification Search .......... 455/437–439, 455/450, 452.1, 453, 435.1, 432.1, 436, 432.3, 455/443, 448; 370/328, 338
See application file for complete search history.

(56) References Cited

U.S. PATENT DOCUMENTS

| 6,895,235 B2* | 5/2005 | Padgett et al. ............ 455/406 |
| 7,173,918 B2* | 2/2007 | Awater et al. ............ 370/332 |
| 7,177,649 B1* | 2/2007 | Nielsen .................... 455/453 |

* cited by examiner

*Primary Examiner* — Un C Cho

(57) ABSTRACT

A network includes access points that admit/terminate mobile station associations based upon the loading level of the access point and/or whether a mobile station can associate with a further access point. Mobile stations transmit information indicative of the access points to which they can associate. The access points determine whether to admit/terminate a mobile station association based upon access point loading.

18 Claims, 3 Drawing Sheets

WLAN HAVING LOAD BALANCING BY ACCESS POINT ADMISSION/TERMINATION

CROSS REFERENCE TO RELATED APPLICATIONS

This application is a continuation of prior U.S. patent application Ser. No. 10/292,863, filed Nov. 12, 2002, now U.S. Pat. No. 7,406,319 which claims the benefit of U.S. Provisional Patent Application No. 60/332,956, filed Nov. 19, 2001, each of which is incorporated herein by reference in its entirety.

STATEMENT REGARDING FEDERALLY SPONSORED RESEARCH

Not Applicable.

FIELD OF THE INVENTION

The present invention relates generally to communication networks and, more particularly, to wireless communication networks.

BACKGROUND OF THE INVENTION

Wireless communication networks for providing links to mobile stations are well known in the art. In one type of wireless network, a series of access points provide wireless connections to various mobile users. For example, a building can include access points located at strategic locations to serve mobile users as they move throughout the building. The mobile users migrate from access point to access point based upon the strength of beacon signals from the various access points. That is, the mobile stations use the strength of the beacon signals to select the best access point at a given point in time.

With changes in the channel environment and number of users in a Wireless Local Area Network (WLAN) system, different access points experience different loading. That is, the number of users served by each of the access points varies over time. Those access points that serve a relatively high number of stations (hot spots) can become overloaded and experience reduced performance. For example, an access point can become overloaded during a meeting in a conference room proximate the access point when the attendees attempt to connect their laptops to the corporate intranet.

It would, therefore, be desirable to adjust the loading of network access points to reduce network congestion.

SUMMARY OF THE INVENTION

The present invention provides a wireless network having access points with mobile station association admission/termination control for access point load balancing in accordance with the present invention. With this arrangement, overall network performance is enhanced by more efficient access point loading. While the invention is primarily shown and described in conjunction with wireless access points in a 802.11 network, it is understood that the invention is applicable to wireless networks in general in which it is desirable to distribute loading.

In one aspect of the invention, a wireless network includes a series of access points to which mobile stations can associate. In the case where an access point becomes relatively heavily loaded, or overloaded, the access point can decline association requests from additional mobile stations. In addition, an access point may terminate an existing association under certain conditions, such as where an associated mobile station has the option to associate with a further access point.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
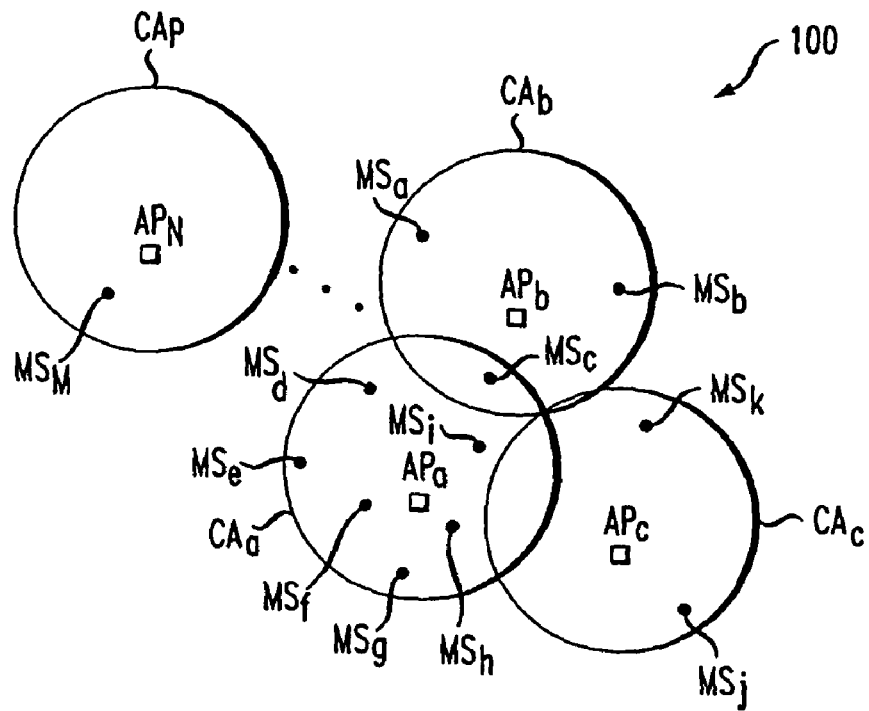
FIG. 1 is a schematic depiction of a wireless network having access points that can decline/terminate mobile station associations in accordance with the present invention.

FIG. 1 shows an exemplary wireless network 100 having access points that perform load balancing by access point admission control of mobile stations and/or termination of mobile station associations. The network 100 includes a series of access points $AP_{a-N}$ having associated coverage areas $CA_{a-P}$ serving various mobile stations $MS_{a-M}$. In general, each access point $Ap_{a-N}$ evaluates its loading level to determine whether additional mobile station associations are feasible, e.g., would not result in (or make worse) an overload condition for the access point. In addition, an access point can terminate a mobile station association under certain conditions to distribute access point loading. For example, a mobile station may transmit an indication to an overloaded access point that there are other access points to which the mobile station can associate itself. The overloaded access point may terminate the association and the mobile station can attempt to associate with another access point having a lower traffic loading level.

For example, a relatively highly loaded access point, here shown as $AP_a$, can determine that it should not accept additional associations, such as from $MS_c$. Or this access point $AP_a$ may terminate an association with the mobile station $MS_c$. In one embodiment, the access point terminates an association with the mobile station having the greatest number of access point options. This mobile station $MS_c$ then looks for another access point, e.g., $AP_b$, to which an association request can be made, as described in detail below.

In an exemplary embodiment, after an association is terminated, the mobile station "remembers" which access point terminated the association and does not attempt to associate with that access point until a predetermined event occurs, e.g., a time interval expires, etc. This prevents the mobile station from bouncing around between access points.

In one embodiment, the access points AP receive information from the mobile stations MS indicating how many access points each mobile station can "hear." As used herein, a mobile station can "hear" an access point if the associated beacon signal is received by the mobile station at or above a predetermined power level. However, further techniques, such as error rates, for evaluating a link between an access point and a mobile station will be readily apparent to one of ordinary skill in the art.

It is understood that a determination as to whether an access point should accept an additional association or terminate an existing association can be based upon a wide variety of factors, including number of associated mobile stations, link bandwidth, expected traffic levels, traffic intensity, packet error rate, packet delay at the access point, and the measurement of the received signal power from a subset of stations. It is understood that these factors can be considered in a range of techniques, such as weighting selected factors.

It is further understood that the term "mobile station," as used herein, should be construed broadly to include various wireless devices, such as laptops, Personal Digital Assistants (PDAs), mobile phones, and the like. Similarly, the term "access point" should be broadly construed to include transmitters/receivers in general that can provide a radio link with a mobile station.

Before describing further details of the present invention, some basic concepts are now described. In conventional wireless networks having mobile stations served by various access points, such as in a 802.11 network, there is a standard procedure by which mobile stations associate themselves with an access point. The IEEE 802.11 standard is defined in International Standard ISO/IEC 8802-111, "Information Technology-Telecommunications and Information Exchange Area Networks," 1999 Edition, which is hereby incorporated by reference in its entirety. Before a mobile station associates with an access point, it obtains information of nearby access points by scanning the frequency channels for their beacons. The access points typically send out beacon flames periodically.

In traditional WLANs, such as 802.11 networks, beacon powers of access points are kept at a fixed level. The mobile station simply chooses the access point with the best signal strength for association. However, it is possible that one access point may be already overloaded, although it has the strongest signal strength to the mobile station.

While the following descriptions are applicable to 802.11 WLANs, it is understood that the invention applies to wireless networks in general using similar formats and mechanisms. Table 1 below shows the beacon frame body of a management frame of subtype Beacon with each of the listed components specified in the 802.11 standard.

TABLE 1

Beacon frame body

| Order | Information | Notes |
|---|---|---|
| 1 | Timestamp | Time/day/etc information |
| 2 | Beacon interval | Time between beacon intervals |
| 3 | Capability information | Resource parameters, polling parameters, etc. |
| 4 | SSID | Service Set ID (Wireless Network Name) |
| 5 | Supported rates | Data Rates supported by the system/device |
| 6 | FH Parameter Set | The FH Parameter Set information element is present within Beacon frames generated by STAs (Mobile STAtions) using frequency-hopping (FH) PHYs (PHYsical layer modulations) |
| 7 | DS Parameter Set | The DS Parameter Set information element is present within Beacon frames generated by STAs using direct sequence (DS) PHYs |

TABLE 1-continued

Beacon frame body

| Order | Information | Notes |
|---|---|---|
| 8 | CF Parameter Set | The CF (Contention Free) Parameter Set information element is only present within Beacon frames generated by APs (Access Points) supporting a PCF (Point Coordination Function) |
| 9 | IBSS Parameter Set | The IBSS (Independent Basic Service Set) Parameter Set information element is only present within Beacon frames generated by STAs in an IBSS |
| 10 | TIM | The TIM (Traffic Information Map) information element is only present within Beacon frames generated by APs |

Typically, the mobile station can operate in either Passive Scanning mode or Active Scanning mode. In Passive Scanning mode, the mobile station listens to each channel scanned for no longer than a maximum duration defined by the ChannelTime parameter. The Active Scanning mode involves the generation of a Probe Request frame by the mobile stations, which is shown in Table 2 below, and the subsequent processing of a received Probe Response frame, which is shown in Table 3, by the access point.

TABLE 2

Probe Request frame body

| Order | Information |
|---|---|
| 1 | SSID |
| 2 | Supported rates |

TABLE 3

Probe Response frame body

| Order | Information | Notes |
|---|---|---|
| 1 | Timestamp | Time/day/etc. information |
| 2 | Beacon interval | Time between beacon intervals |
| 3 | Capability information | Resource parameters, polling parameters, etc. |
| 4 | SSID | Service Set ID (Wireless Network Name) |
| 5 | Supported rates | Data Rates supported by the system/device |
| 6 | FH Parameter Set | The FH Parameter Set information element is present within Beacon frames generated by STAs using frequency-hopping PHYs |
| 7 | DS Parameter Set | The DS Parameter Set information element is present within Beacon frames generated by STAs using direct sequency PHYs |
| 8 | CF Parameter Set | The CF Parameter Set information element is only present within Beacon frames generated by APs supporting a PCF |
| 9 | IBSS Parameter Set | The IBSS Parameter Set information element is only present within Beacon frames generated by STAs in an IBSS |

After scanning the access point beacons, the mobile station adopts the BSSID (Basic Service Set ID: Access Point ID) and channel synchronization information in a Beacon (passive) or Probe Response (active) coming from the access point with the best signal strength. An Association/Reassociation Request is then issued by the mobile station as it attempts to associate with the selected access point. The access point then responds with an Association Response. The corresponding Association Request and Association Response frame formats are shown below in Table 4 and Table 5, respectively. It is understood that further actions, such as authentication, take place before or after the association phase.

TABLE 4

Association/Reassociation Request frame body

| Order | Information |
|---|---|
| 1 | Capability information |
| 2 | Listen interval |
| 3 | SSID |
| 4 | Supported rates |

TABLE 5

Association Response frame body

| Order | Information |
|---|---|
| 1 | Capability information |
| 2 | Status code |
| 3 | Association ID (AID) |
| 4 | Supported rates |

In accordance with the present invention, an access point can admit/terminate mobile station associations based upon the loading level of the access point. The mobile station transmits information relating the number of access points that are available for association and the access points keep track of loading levels. Based upon mobile station options for association and access point loading, each access point accepts or rejects new association requests and selectively terminates existing associations to optimize overall access point load levels.

Figure 2:
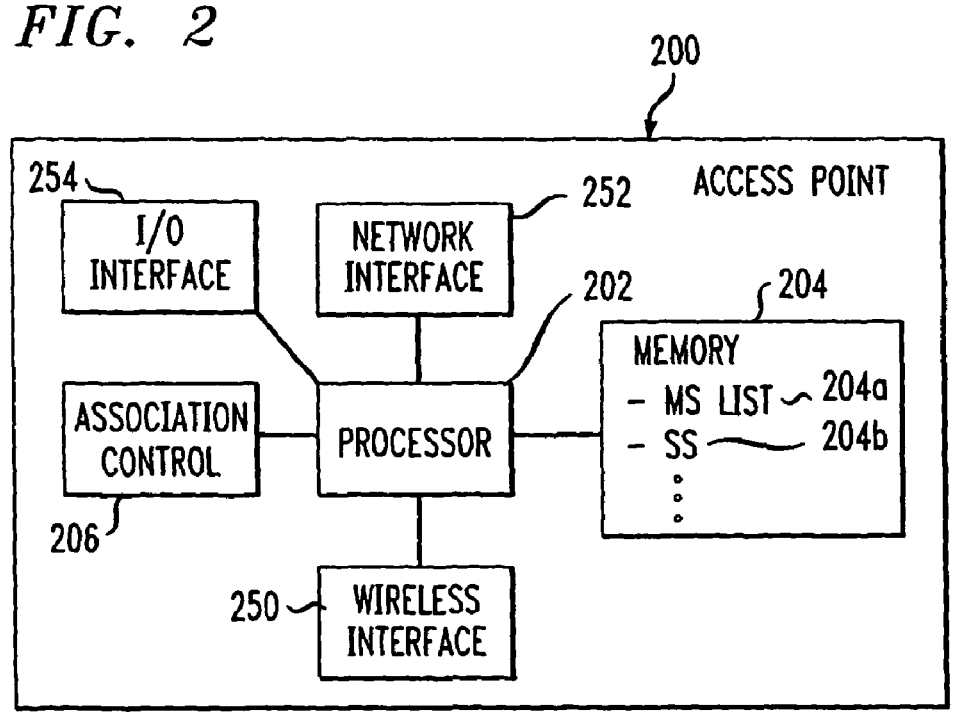
FIG. 2 is a schematic block diagram of an exemplary access point that can decline/terminate mobile station associations in accordance with the present invention.

FIG. 2 shows an exemplary access point 200 having a processor 202 for controlling the overall operation of the access point and a memory 204. The access point 200 further includes an association control module 206 for handling mobile station association admission/termination, as described more fully below. The access point 200 can further include conventional components including a wireless interface 250 including one or more RF transceivers, a network interface 252 for interacting with a wired network, and an I/O interface 254 for communicating with various components, such as peripheral equipment.

Referring again to FIG. 1, some mobile stations, such as MSc, will report that they can hear not only the currently associated access point $AP_a$, but also one or more additional access points $AP_b$. In general, mobile stations can "hear" an access point if the beacon signal from the access point has a received signal strength at or above a predetermined threshold. Other mobile stations, e.g., $MS_e$, will report that they can only hear their current access point $AP_a$.

Due to a termination of an existing association between an access point, e.g., $AP_a$, and a mobile station, e.g., $MS_c$, the mobile station $MS_c$ can attempt to associate itself with a further access point, e.g., $AP_b$. This in turn reduces the load and traffic intensity over the current access point $AP_a$.

Referring now to FIG. 1 in conjunction with FIG. 2, the signal information transmitted by the mobile station $MS_{a-N}$ can be stored in the access point memory 204, such as in a database, which can store, for example, a list 204a of mobile stations and the access points that are available to each mobile station. The memory can also store a received signal strength 204b for each mobile station/access point. For single access point mobile stations, e.g., $MS_e$, the current access point $AP_a$ can measure the received signal strength.

In an exemplary embodiment, frequency option information can be conveyed in the Association/Reassociation request frame, which is shown above in Tables 4 and 5. These two management frames contain the same Capability Information field, which is used to indicate requested or advertised capabilities. In an illustrative embodiment, the length of the Capability Information field is two octets.

Figure 3:
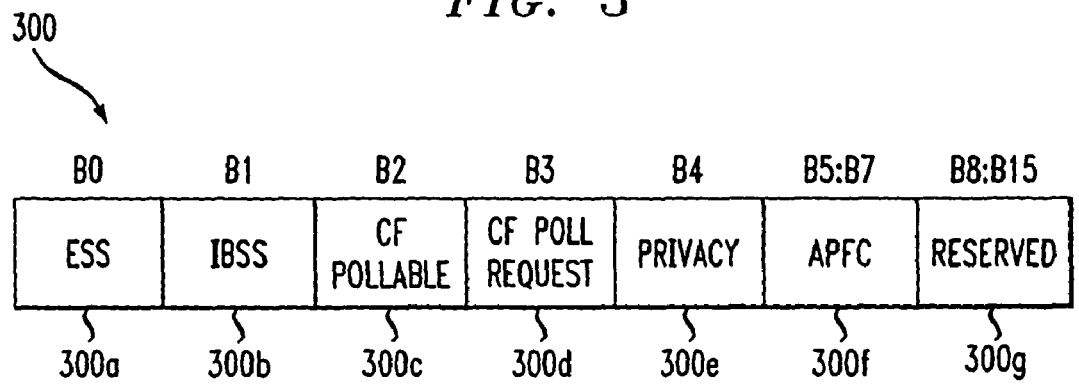
FIG. 3 is a pictorial representation of an exemplary capability field that can be contained in a message exchanged by an access point and a mobile station in accordance with the present invention.

FIG. 3 shows an exemplary Capability Information field 300 having sub fields of ESS 300a, IBSS 300b, CFPollable 302c, CFPoll Request 302d, and Privacy 302e, together using five of the sixteen total bits. In an exemplary embodiment, three bits form a further subfield APFC 300f used to indicate access points that a given mobile station can associate with in frequency channels other than the frequency for the currently communicating access point. The remaining bits 300g of the Capability Information field 300 are reserved.

In another embodiment the capability information field uses one bit to indicate whether there is an alternative access point with sufficient signal strength available to the mobile station and uses additional bits (e.g., two to three bits) to indicate the rough signal quality of the alternative access point(s). This information can be used later by the current access point to assess if the particular mobile is able to move to the alternative access point.

Figure 4A:
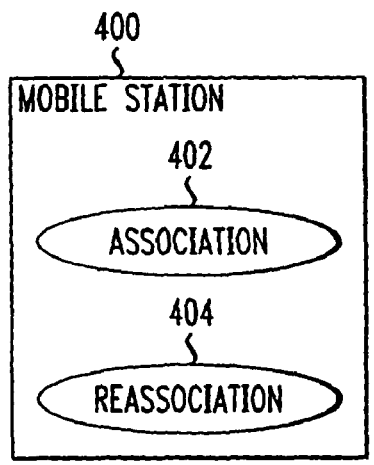
FIG. 4A is a schematic depiction of a mobile station for associating with an access point that can decline/terminate associations in accordance with the present invention.

FIG. 4A show an exemplary mobile station 400 that can communicate access point signal information to network access points in accordance with the present invention. The mobile station 400 includes an association function 402 that determines the number of access points which the mobile station can associate with as included in the Capability Information field in the Association/Reassociation request frame, thus conveying the information to the current access point. In one embodiment, the association function 402 scans the frequency channels to determine those access points for which the received beacon signal is greater than a predetermined threshold, for example. For each access point beacon signal that is greater than the threshold, the mobile station can consider those access points as viable options in the event of an association request denial or association termination. Later, this information can be kept updated by a reassociation function 404 via reassociation requests by the mobile when there is a change, e.g., another access point is no longer available for the mobile station. The reassociation function 404 can indicate the number of access points that the mobile station can potentially associate with as identified in the Capability Information field.

Figure 4B:
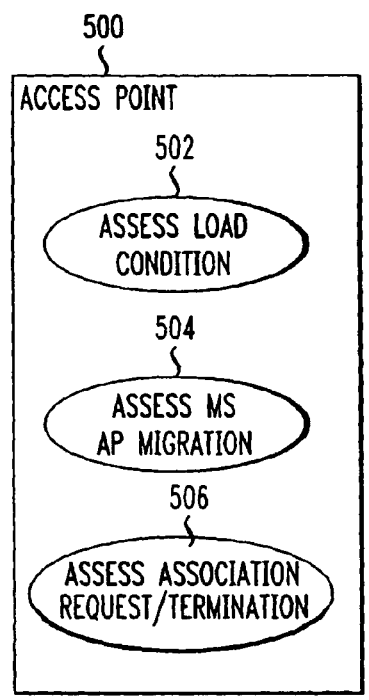
FIG. 4B is a schematic depiction of an access point that can decline/terminate associations in accordance with the present invention.

As shown in FIG. 4B, an exemplary access point 500 can include a first local function 502 to assess the medium load condition, e.g., determine the number of mobile stations associated with the access point, their bandwidth usage, transmission queue length, number of error packets compared to the total traffic, etc. The access point 500 can further include a second local function 504 to assess the likelihood that a currently associated mobile station can associate with a different access point. More particularly, the access point 500 evaluates whether the signal strength of a further access point to the mobile station is sufficient to enable migration to the further access point based upon information in the mobile station database 204 of FIG. 2, for example. The access point 500 can further include an association control module 506 for determining whether to accept association requests and when to terminate current associations, as described above.

In an exemplary embodiment, an access point transmits a disassociation frame to a mobile station in the event that the access point has determined that an association should be terminated to enhance the overall access point loading. The disassociation frame body can contain a reason code associated with the termination. An exemplary list of reason codes is set forth below in Table 6.

TABLE 6

Reason Codes

| REASON CODE | MEANING |
|---|---|
| 0 | Reserved |
| 1 | Unspecified |
| 2 | Previous authentication invalid |
| 3 | Deauthenticated because sending station is leaving (or has left) IBSS or ESS |
| 4 | Disassociated due to inactivity |
| 5 | Disassociated because AP is unable to handle all currently associated stations |
| 6 | Class 2 frame received from non-authenticated station |
| 7 | Class 3 frame received from non-associated station |
| 8 | Disassociated because sending station is leaving (or has left) BSS |
| 9 | Station requesting (re)association with responding station |
| 10 and up | Reserved |

Upon receiving the disassociation frame, the mobile station stores the reason code and the transmitting access point. The mobile station, through the association module 402 of FIG. 4A, for example, then attempts to associate with a further access point. However, the association module 402 will not subsequently attempt to associate with the terminating access point. By remembering that a particular access point has terminated an association, the mobile station avoids sending association requests to that access point. The mobile station can treat an access point that has denied an association request in a similar manner.

It is understood that the mobile station can attempt to associate with a terminating/denying access point after a predetermined event, such as an expired time duration. A variety of other such events will be readily apparent to one of ordinary skill in the art.

Figure 5:
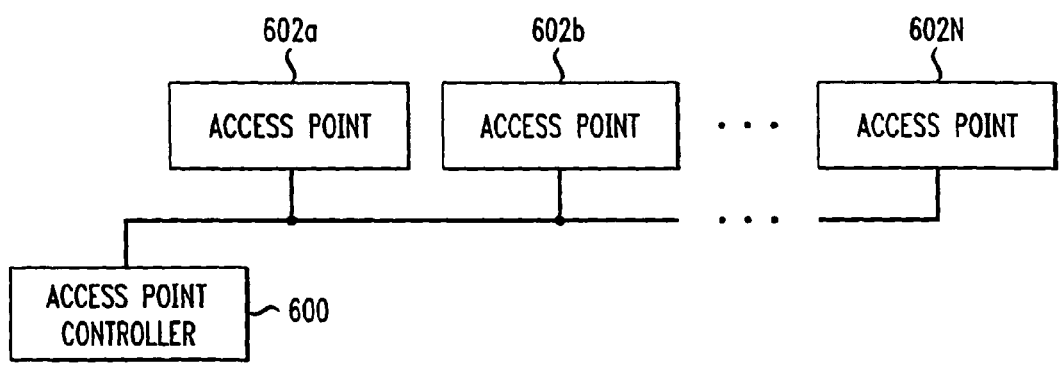
FIG. 5 is a schematic depiction of a network having an access point controller for controlling loading of network access points in accordance with the present invention.

In an alternative embodiment shown in FIG. 5, access point association/termination decisions are controlled by a central access point controller 600 coupled to the access points 602a-N in the network. The controller 600 receives association and loading information from the access points 602 and evaluates the overall impact of requested mobile station association requests and mobile station association terminations for each access point to achieve optimal load balancing in the overall network.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. An access point, comprising:
a module for determining a loading level of the access point; and
an association module for determining whether to terminate an association with a mobile station based at least in part upon the loading level of the access point, wherein the association module is further adapted to terminate an association with a particular mobile station based on the number of access points the particular mobile station can associate with.

2. The access point according to claim 1, wherein the access point forms a part of an 802.11 network.

3. The access point of claim 1 further comprising:
a memory for storing mobile station and access point association information.

4. The access point of claim 3 wherein the association module is further adapted to determine whether to terminate an association with the particular mobile station based on the stored mobile station and access point association information.

5. The access point of claim 1 wherein the module for determining a loading level of the access point is adapted to determine a number of mobile stations associated with the access point.

6. The access point of claim 5 wherein the module for determining a loading level of the access point is further adapted to determine a bandwidth usage of the mobile stations associated with the access point.

7. The access point of claim 1 wherein the module for determining a loading level of the access point is adapted to determine a transmission queue length.

8. The access point of claim 1 wherein the module for determining a loading level of the access point is adapted to determine a number of transmitted error packets.

9. A method of distributing access point loading in a wireless network, comprising:
determining a loading level of an access point;
determining whether to terminate an association with a mobile station based on the determined loading level of the access point; and
terminating an association with a particular mobile station based on the number of access points the particular mobile station can associate with.

10. The method of claim 9 wherein determining a loading level of an access point comprises:
determining a number of mobile stations associated with the access point.

11. The method of claim 9 wherein determining a loading level of an access point comprises:
determining a transmission queue length.

12. The method of claim 9 wherein determining a loading level of an access point comprises:
determining a number of transmitted error packets.

13. The method of claim 9 wherein determining a loading level of an access point comprises:
determining a bandwidth usage of mobile stations associated with the access point.

14. The method of claim 9 wherein determining a loading level of an access point comprises:
determining a quality of a link between the mobile station and the access point.

15. The method of claim 9 further comprising:
transmitting an association response to the mobile station.

16. The method of claim 15 further comprising:
determining the association response, wherein the association response includes data rates supported by the access point and the determined loading level.

17. The method of claim 9 further comprising:
determining the access point should not accept associations with mobile stations, the determination based on the determined loading level of the access point.

18. The method of claim 9 further comprising:
terminating an association with the mobile station based on the determined loading level of the access point.

* * * * *